(12) United States Patent  
Kobayashi et al.

(10) Patent No.: US 11,267,430 B2  
(45) Date of Patent: Mar. 8, 2022

(54) KNEE PROTECTION AIRBAG DEVICE

(71) Applicant: TOYODA GOSEI CO., LTD., Kiyosu (JP)

(72) Inventors: Kazuhito Kobayashi, Kiyosu (JP); Minoru Ono, Kiyosu (JP); Naoki Hotta, Kiyosu (JP); Tetsuya Ogata, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 48 days.

(21) Appl. No.: 16/842,958

(22) Filed: Apr. 8, 2020

(65) Prior Publication Data

US 2020/0339059 A1    Oct. 29, 2020

(30) Foreign Application Priority Data

Apr. 23, 2019    (JP) .............................. JP2019-082240

(51) Int. Cl.
*B60R 21/215* (2011.01)
*B60R 21/231* (2011.01)
*B60R 21/017* (2006.01)
*B60R 21/26* (2011.01)

(52) U.S. Cl.
CPC .......... *B60R 21/231* (2013.01); *B60R 21/017* (2013.01); *B60R 21/215* (2013.01); *B60R 21/26* (2013.01); *B60R 2021/23169* (2013.01)

(58) Field of Classification Search
CPC ... B60R 21/231; B60R 21/215; B60R 21/017; B60R 21/26; B60R 2021/23169; B60R 21/2171; B60R 21/206
See application file for complete search history.

(56) References Cited

U.S. PATENT DOCUMENTS

| | | | | | |
|---|---|---|---|---|---|
| 5,257,815 | A | * | 11/1993 | Bachelder | ........... B60R 21/2171 280/728.2 |
| 5,458,362 | A | * | 10/1995 | Buchanan | ........... B60R 21/2171 280/728.2 |
| 5,501,484 | A | * | 3/1996 | Saderholm | ............ B60R 21/217 280/728.2 |

(Continued)

FOREIGN PATENT DOCUMENTS

| | | |
|---|---|---|
| JP | 2018-167796 A | 11/2018 |
| JP | 2019-119265 A | 7/2019 |

*Primary Examiner* — Paul N Dickson  
*Assistant Examiner* — Timothy Wilhelm  
(74) *Attorney, Agent, or Firm* — Posz Law Group, PLC

(57) ABSTRACT

A knee protection airbag device includes: an airbag that is folded and stored; an inflator configured to supply inflation gas to the airbag; a case that stores the airbag and the inflator; and an airbag cover covering the folded airbag. The airbag cover includes a door portion that covers a protruding opening and can be opened when the airbag is deployed and inflated, and is attached to a peripheral wall portion of the case around the door portion. A recessed groove through which a harness main body can be inserted is formed at a portion of a peripheral edge of the protruding opening in the case so as to recess an end edge of the peripheral wall portion. A bead for reinforcement at a peripheral edge portion of the recessed groove is formed on the peripheral wall portion so as to surround a periphery of the recessed groove.

2 Claims, 11 Drawing Sheets

(56) References Cited

U.S. PATENT DOCUMENTS

| | | | | |
|---|---|---|---|---|
| 5,564,735 A * | 10/1996 | Boy | B60R 21/21 | 280/730.2 |
| 5,601,332 A * | 2/1997 | Schultz | B60N 2/4235 | 297/216.13 |
| 5,687,987 A * | 11/1997 | Spencer | B60R 21/207 | 280/728.2 |
| 5,890,733 A * | 4/1999 | Dillon | B60R 21/207 | 280/730.2 |
| 5,911,434 A * | 6/1999 | Townsend | B60R 21/207 | 280/730.2 |
| 5,947,630 A * | 9/1999 | Dillon | F16B 21/086 | 403/393 |
| 5,967,546 A * | 10/1999 | Homier | B60N 2/5883 | 280/730.2 |
| 5,967,547 A * | 10/1999 | Narita | B60R 21/207 | 280/730.2 |
| 5,992,878 A * | 11/1999 | Narita | B60R 21/207 | 280/730.2 |
| 6,007,089 A * | 12/1999 | Gotz | B60R 21/21 | 280/728.3 |
| 6,092,832 A * | 7/2000 | Worrell | B60R 21/2035 | 280/728.2 |
| 6,126,192 A * | 10/2000 | Enders | B60R 21/2176 | 280/728.2 |
| 6,129,419 A * | 10/2000 | Neale | B60N 2/58 | 297/284.4 |
| 6,237,936 B1 * | 5/2001 | Quade | B60R 21/207 | 280/728.2 |
| 6,402,240 B1 * | 6/2002 | Toba | B60N 2/002 | 297/217.3 |
| 6,439,597 B1 * | 8/2002 | Harada | B60R 21/207 | 280/728.2 |
| 6,457,741 B2 * | 10/2002 | Seki | B60R 21/207 | 280/730.2 |
| 6,578,911 B2 * | 6/2003 | Harada | B60N 2/5825 | 280/730.2 |
| 6,857,655 B2 * | 2/2005 | Muller | B60R 21/2155 | 280/728.3 |
| 6,976,700 B2 * | 12/2005 | McCann | B60R 21/2171 | 280/728.2 |
| 7,048,297 B2 * | 5/2006 | Schneider | B60R 21/217 | 280/728.2 |
| 7,204,510 B2 * | 4/2007 | Bossenmaier | B60R 21/20 | 280/730.2 |
| 7,216,934 B1 * | 5/2007 | Kobari | B60R 21/207 | 297/180.14 |
| 7,232,150 B2 * | 6/2007 | Nagayama | B60R 21/20 | 280/728.3 |
| 7,267,363 B2 * | 9/2007 | Tredez | B60R 21/207 | 280/730.2 |
| 7,370,879 B2 * | 5/2008 | Hotta | B60R 21/206 | 280/728.2 |
| 7,490,899 B2 * | 2/2009 | McMillen | B60N 2/665 | 297/284.1 |
| 7,530,595 B2 * | 5/2009 | Naruse | B60R 21/21 | 280/728.2 |
| 7,604,250 B2 * | 10/2009 | Hotta | B60R 21/206 | 280/728.2 |
| 7,654,555 B2 * | 2/2010 | Schaupp | B60R 21/2171 | 280/728.2 |
| 7,654,556 B2 * | 2/2010 | Vigeant | B60R 21/201 | 280/728.2 |
| 7,661,697 B2 * | 2/2010 | Itoga | B60R 21/2171 | 280/728.2 |
| 7,669,888 B2 * | 3/2010 | Sato | B60R 21/23138 | 280/730.2 |
| 7,677,594 B2 * | 3/2010 | Hazlewood | B60N 2/5883 | 280/728.2 |
| 7,699,340 B2 * | 4/2010 | Okuhara | B60R 21/2171 | 280/728.2 |
| 7,753,407 B2 * | 7/2010 | Yokota | B60R 21/20 | 280/743.2 |
| 7,798,519 B2 * | 9/2010 | Kawabe | B60R 21/207 | 280/728.3 |
| 7,850,196 B2 * | 12/2010 | Kashiwagi | B60R 21/233 | 280/728.2 |
| 7,905,307 B2 * | 3/2011 | Kubota | H01M 10/6556 | 180/68.1 |
| 7,938,436 B2 * | 5/2011 | Lunt | B60R 21/2171 | 280/728.2 |
| 8,123,246 B2 * | 2/2012 | Gilbert | B60R 21/217 | 280/728.2 |
| 8,146,942 B2 * | 4/2012 | Bruning | B60R 21/205 | 280/728.2 |
| 8,172,257 B2 * | 5/2012 | Wandtke | B60R 21/21 | 280/728.2 |
| 8,196,954 B2 * | 6/2012 | Choi | B60R 21/2176 | 280/728.3 |
| 8,226,113 B2 * | 7/2012 | Yamashita | B60R 21/2171 | 280/730.2 |
| 8,316,516 B2 * | 11/2012 | Hoehe | A44B 18/0007 | 24/452 |
| 8,454,050 B2 * | 6/2013 | Schorle | B60R 21/217 | 280/728.2 |
| 8,528,934 B2 * | 9/2013 | Kobayshi | B60R 21/207 | 280/740 |
| 8,534,701 B2 * | 9/2013 | Sosnowski | B60N 2/289 | 280/730.2 |
| 8,596,674 B2 * | 12/2013 | Fukawatase | B60N 2/99 | 280/730.2 |
| 8,651,518 B2 * | 2/2014 | Shamoto | B60N 2/5825 | 280/730.2 |
| 8,662,531 B2 * | 3/2014 | Tracht | B60R 21/2165 | 280/730.2 |
| 8,684,399 B2 * | 4/2014 | Honda | B60R 21/2171 | 280/728.2 |
| 8,733,832 B2 * | 5/2014 | Fukawatase | B60N 2/4235 | 297/216.1 |
| 8,746,732 B1 * | 6/2014 | Kutchey | B60R 21/2171 | 280/728.2 |
| 8,752,861 B2 * | 6/2014 | Fukawatase | B60R 21/207 | 280/728.2 |
| 8,764,049 B2 * | 7/2014 | Lusk | B60R 21/207 | 280/728.2 |
| 8,807,591 B2 * | 8/2014 | Nakata | D05B 23/00 | 280/728.3 |
| 8,955,877 B2 * | 2/2015 | Broussard | B60R 21/206 | 280/732 |
| 9,022,415 B2 * | 5/2015 | Kim | B60R 21/213 | 280/728.1 |
| 9,278,662 B2 * | 3/2016 | Hotta | B60R 21/217 | |
| 9,296,352 B2 * | 3/2016 | Fujiwara | B60R 21/2171 | |
| 9,415,739 B2 * | 8/2016 | Mihm | B60N 2/90 | |
| 9,463,768 B2 * | 10/2016 | Tanabe | B60R 21/215 | |
| 9,539,975 B2 * | 1/2017 | Tanabe | B60R 21/207 | |
| 9,545,891 B2 * | 1/2017 | Tanabe | B60R 21/207 | |
| 9,598,040 B2 * | 3/2017 | Tanabe | B60N 2/5825 | |
| 9,616,791 B2 * | 4/2017 | Awata | B60N 2/986 | |
| 9,630,584 B2 * | 4/2017 | Fujiwara | B60R 21/2171 | |
| 9,688,230 B2 * | 6/2017 | Makita | B60R 21/207 | |
| 9,896,053 B2 * | 2/2018 | Tanabe | B60N 2/986 | |
| 10,005,418 B2 * | 6/2018 | Ito | B60N 2/986 | |
| 10,059,297 B2 * | 8/2018 | Tanabe | B60R 21/2334 | |
| 10,272,870 B2 * | 4/2019 | Festag | B60R 13/0237 | |
| 10,399,533 B2 * | 9/2019 | Yoshikai | B60N 2/5883 | |
| 10,737,654 B2 * | 8/2020 | Ono | B60R 21/217 | |
| 10,800,369 B2 * | 10/2020 | Hioda | B60R 21/26 | |
| 10,994,686 B2 * | 5/2021 | Inoue | B60R 21/215 | |
| 2002/0084630 A1 * | 7/2002 | Aulbach | B60R 21/207 | 280/728.2 |
| 2004/0239080 A1 * | 12/2004 | Berrahou | B60R 21/203 | 280/728.2 |
| 2005/0029784 A1 * | 2/2005 | Siegel | B60R 21/26 | 280/736 |
| 2005/0161927 A1 * | 7/2005 | Yokoyama | B60R 21/23138 | 280/743.1 |
| 2006/0006630 A1 * | 1/2006 | Schwarz | B60R 21/2171 | 280/728.2 |

(56) References Cited

U.S. PATENT DOCUMENTS

| | | | |
|---|---|---|---|
| 2006/0061073 A1* | 3/2006 | Naruse | B60R 21/21 280/730.2 |
| 2007/0182131 A1* | 8/2007 | Helbig | B60R 21/2171 280/728.2 |
| 2008/0007035 A1* | 1/2008 | Acker | B60R 21/261 280/742 |
| 2008/0084051 A1* | 4/2008 | Okuhara | B60R 21/2171 280/728.2 |
| 2009/0039627 A1* | 2/2009 | Yokota | B60R 21/2346 280/730.2 |
| 2009/0152838 A1* | 6/2009 | Robins | B60R 21/2171 280/728.2 |
| 2010/0181746 A1* | 7/2010 | Rose | B60R 21/2171 280/736 |
| 2010/0253050 A1* | 10/2010 | Mitsuo | B60R 21/206 280/730.1 |
| 2014/0197621 A1* | 7/2014 | Thomas | B60R 21/207 280/730.2 |
| 2015/0061266 A1* | 3/2015 | Jordan | B60R 21/21 280/728.3 |
| 2015/0076802 A1* | 3/2015 | Tanabe | B60R 21/207 280/730.2 |
| 2015/0151711 A1* | 6/2015 | Fujiwara | B60R 21/2342 280/728.2 |
| 2015/0266445 A1* | 9/2015 | Kojima | B60R 21/2171 280/728.2 |
| 2015/0367805 A1* | 12/2015 | Santi | B60R 21/207 280/728.3 |
| 2016/0009247 A1* | 1/2016 | Fujiwara | B60R 21/2171 280/728.2 |
| 2016/0009248 A1* | 1/2016 | Tanabe | B60R 21/276 280/728.2 |
| 2016/0244018 A1* | 8/2016 | Zimmermann | B60N 2/58 |
| 2016/0288838 A1* | 10/2016 | Kindaichi | B60N 2/4235 |
| 2016/0325646 A1* | 11/2016 | Tanabe | B60R 21/207 |
| 2017/0066402 A1* | 3/2017 | Fujiwara | B60R 21/217 |
| 2018/0022304 A1* | 1/2018 | Yoshikai | B60R 21/207 280/728.3 |
| 2018/0118149 A1* | 5/2018 | Odai | B60R 21/206 |
| 2018/0281735 A1 | 10/2018 | Shigemura | |
| 2019/0202390 A1* | 7/2019 | Ono | B60R 21/217 |

* cited by examiner

KNEE PROTECTION AIRBAG DEVICE

CROSS-REFERENCE TO RELATED APPLICATION(S)

This application is based upon and claims the benefit of priority from prior Japanese patent application No. 2019-082240 filed on Apr. 23, 2019, the entire contents of which are incorporated herein by reference.

BACKGROUND

1. Field of the Invention

The present invention relates to a knee protection airbag device including an airbag that is folded and stored, an inflator that supplies inflation gas to the airbag, a case that stores the airbag and the inflator, and an airbag cover covering the folded airbag.

2. Description of the Related Art

Conventionally, as a knee protection airbag device, there has been a configuration in which a connector of a wire harness extending from an airbag operation circuit is connected to a connection port portion of an inflator in a state of being stored in a case together with a folded airbag via a connector opening formed in the case (see, for example, JP-A-2018-167796).

The conventional knee protection airbag device has a configuration in which the folded airbag and the inflator are stored in a case, and then the wire harness is connected to the connection port portion of the inflator exposed from the connector opening after an airbag assembly in a state in which the airbag cover is assembled to the case is fixed to a body side of a vehicle. However, depending on a shape of a peripheral member of the vehicle to be mounted, it may be necessary to store the inflator in the case in a state in which the inflator is connected to the wire harness. Even when the inflator is stored in the case in a state of being connected to the wire harness in advance, it is necessary to regulate a position of the inflator with respect to the wire harness.

SUMMARY

The present invention has been made to solve the above-described problems, and an object of the present invention to provide a knee protection airbag device in which an arrangement position of a wire harness with respect to a case can be set, and handleability of the wire harness is good even in a configuration in which an inflator is stored in a case in a state of being connected to the wire harness.

An aspect of the present invention, there is provided a knee protection airbag device including: an airbag that is folded and stored; an inflator configured to supply inflation gas to the airbag; a case that stores the airbag and the inflator; and an airbag cover covering the folded airbag, wherein: the case includes a bottom wall portion and a peripheral wall portion having a substantially tubular shape extending from a peripheral edge of the bottom wall portion, and is formed in a substantially box shape having a protruding opening through which the airbag is capable of protruding; the airbag cover includes a door portion that covers the protruding opening and can be opened when the airbag is deployed and inflated, and is attached to the peripheral wall portion of the case around the door portion; the inflator includes an inflator main body having a substantially cylindrical shape, and a retainer configured to attach the inflator main body to the case side; the inflator main body is configured such that a gas discharge port configured to discharge the inflation gas is disposed on one end side along an axial direction, and a connection port portion for connecting a wire harness extending from an airbag operation circuit is disposed on another end side along the axial direction, and is attached to the case by fixing an attachment means arranged so as to protrude from the retainer to a side perpendicular to the axial direction to the bottom wall portion in a state in which an outer peripheral surface thereof is held by the retainer; the wire harness includes a harness main body and a connector provided on a tip end side of the harness main body; the inflator main body is stored in the case in a state in which the connector is connected to the connection port portion and the wire harness is connected to the inflator main body; a recessed groove through which the harness main body can be inserted is formed at a portion of a peripheral edge of the protruding opening in the case so as to recess an end edge of the peripheral wall portion; and a bead for reinforcement at a peripheral edge portion of the recessed groove is formed on the peripheral wall portion so as to surround a periphery of the recessed groove.

In the knee protection airbag device according to the present invention, the inflator is stored in the case in a state in which the wire harness is connected to the inflator main body, but the recessed groove through which the harness main body of the wire harness can be inserted is formed at a portion of a peripheral edge of the protruding opening of the case so as to recess an end edge of the peripheral wall portion, so that an arrangement position of the harness main body with respect to the case can be regulated by inserting the harness main body through the recessed groove. In addition, since the harness main body is inserted through the recessed groove formed so as to recess the portion of the peripheral edge of the protruding opening and extends out of the case, interference between the harness main body and the airbag cover arranged so as to cover the protruding opening can also be suppressed. Since the harness main body is inserted through the recessed groove of the case, the harness main body can be suppressed from moving with respect to the case during transportation, attachment work to a body side, or the like, and a handling workability of the wire harness is improved during attachment work to the vehicle or the like. Further, since the bead for reinforcement at the peripheral edge portion of the recessed groove is disposed around the recessed groove so as to surround the periphery of the recessed groove, even in a configuration having the recessed groove formed by cutting off the peripheral wall portion itself, which causes a decrease in strength, when the airbag is deployed and inflated, deformation of the case can be suppressed, and the airbag can be smoothly protruded from the protruding opening and inflated.

Therefore, in the knee protection airbag device according to the present invention, an arrangement position of the wire harness with respect to the case can be set, and handleability of the wire harness is good even in a configuration in which the inflator is stored in the case in a state of being connected to the wire harness.

In addition, in the knee protection airbag device according to the present invention, the peripheral wall portion may have a substantially rectangular tubular shape including two long walls arranged along the axial direction of the inflator main body so as to face each other on the side perpendicular to the axial direction of the inflator main body, and two short walls arranged so as to face each other on an axial direction side of the inflator main body, the airbag cover may be configured such that an attachment piece extending from a periphery of the door portion is attached to the long wall, and the recessed groove may be formed in at least one of the short walls.

In the knee protection airbag device having such a configuration, the recessed groove is disposed at a position separated from the attachment piece for attaching the airbag cover disposed to cover the protruding opening of the case to the case, in other words, in the airbag cover, it is not necessary to provide an attachment piece that connects the short walls provided with the recessed grooves, and therefore a portion of the airbag cover covering the short wall can be configured not to cover the recessed groove, so that the interference between the harness main body inserted through the recessed groove and the airbag cover can be accurately suppressed.

Further, in the knee protection airbag device having the above configuration, the two long walls may be disposed so as to face each other on an upper-lower direction side, and the recessed groove may be arranged at a position below the connector on a lower edge side of the short wall, and is formed such that an opening end is positioned below a bottom portion of a recess.

According to the knee protection airbag device having such a configuration, when mounted on the vehicle, since the harness main body is arranged so as to extend downward from the connector by inserting through the recessed groove arranged below the connector, even if rainwater or the like adheres to the harness main body extending out of the case and travels through the harness main body, the rainwater or the like can be dropped from an upward reversal portion in the vicinity of the recessed groove and can be accurately prevented from entering a connector side.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
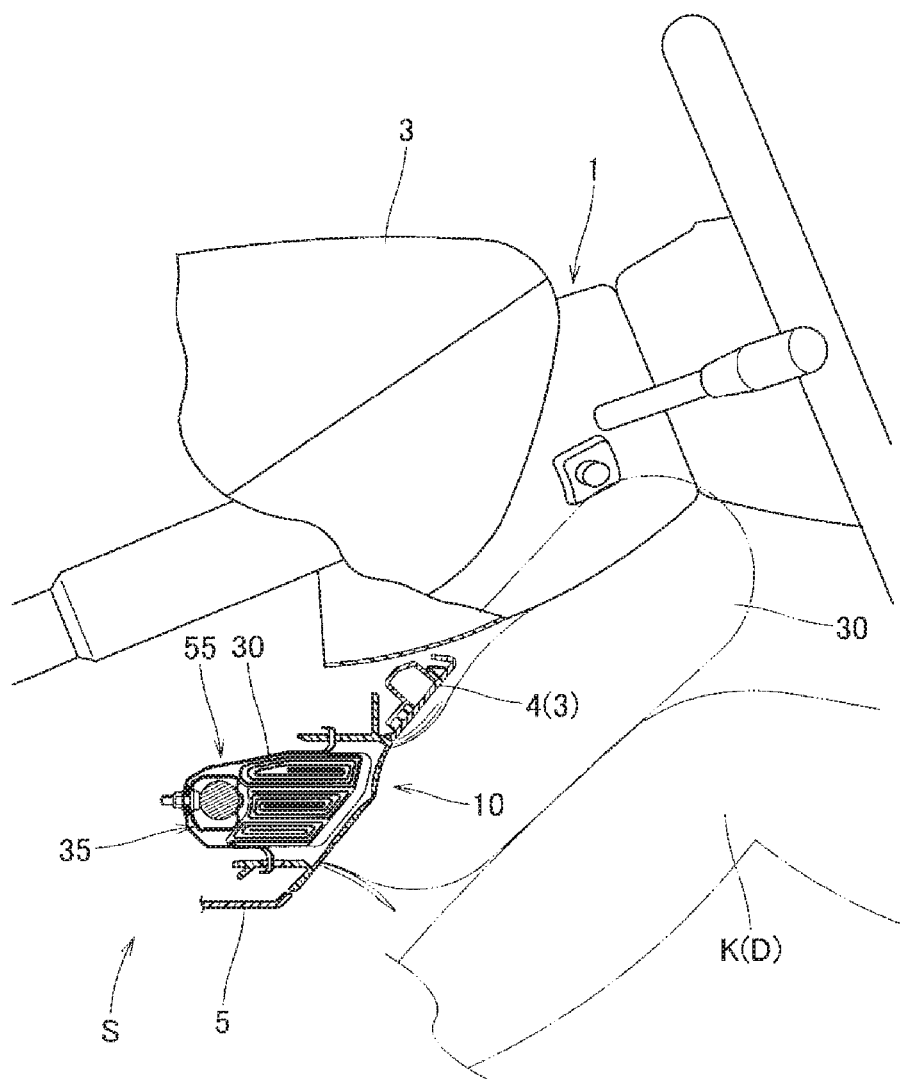
FIG. 1 is a schematic longitudinal sectional view in a vehicle front-rear direction showing a use state of a knee protection airbag device according to an embodiment of the present invention.

Hereinafter, an embodiment of the present invention will be described with reference to the drawings. In the embodiment, as shown in FIG. 1, a knee protection airbag device S disposed below a steering column 1 on a vehicle front side of a driver's seat will be described as an example. A lower panel 4 and an under cover 5 of an instrument panel (hereinafter abbreviated as an instrument panel) 3 that is an interior material are disposed around the airbag device S (see FIG. 1). Note that the under cover may not be disposed. Unless otherwise specified, upper-lower, left-right, and front-rear directions in the present specification coincide with upper-lower, left-right, and front-rear directions of a vehicle when the airbag device S is mounted on the vehicle.

As shown in FIGS. 1 to 5, the airbag device S includes a folded airbag 30, an inflator 35 that supplies inflation gas to the airbag 30, a case 55 storing the folded airbag 30 and the inflator 35, and an airbag cover 10 covering a protruding opening 56a of the case 55 so as to cover the folded airbag 30.

The airbag cover 10 is made of a synthetic resin such as a polyolefin-based thermoplastic elastomer, and is configured to cover the protruding opening 56a of the case 55 (so as to cover the folded airbag 30). Specifically, as shown in FIGS. 2 to 5, the airbag cover 10 includes a door disposing portion 11 disposed so as to cover the rear of a case main body 56 to be described later in the case 55, and a side wall portion 20 that extends forward from peripheries of door portions 13, 13 to be described later formed on the door disposing portion 11 and covers an outer peripheral side of a peripheral wall portion 58 of the case main body 56.

Figure 2:
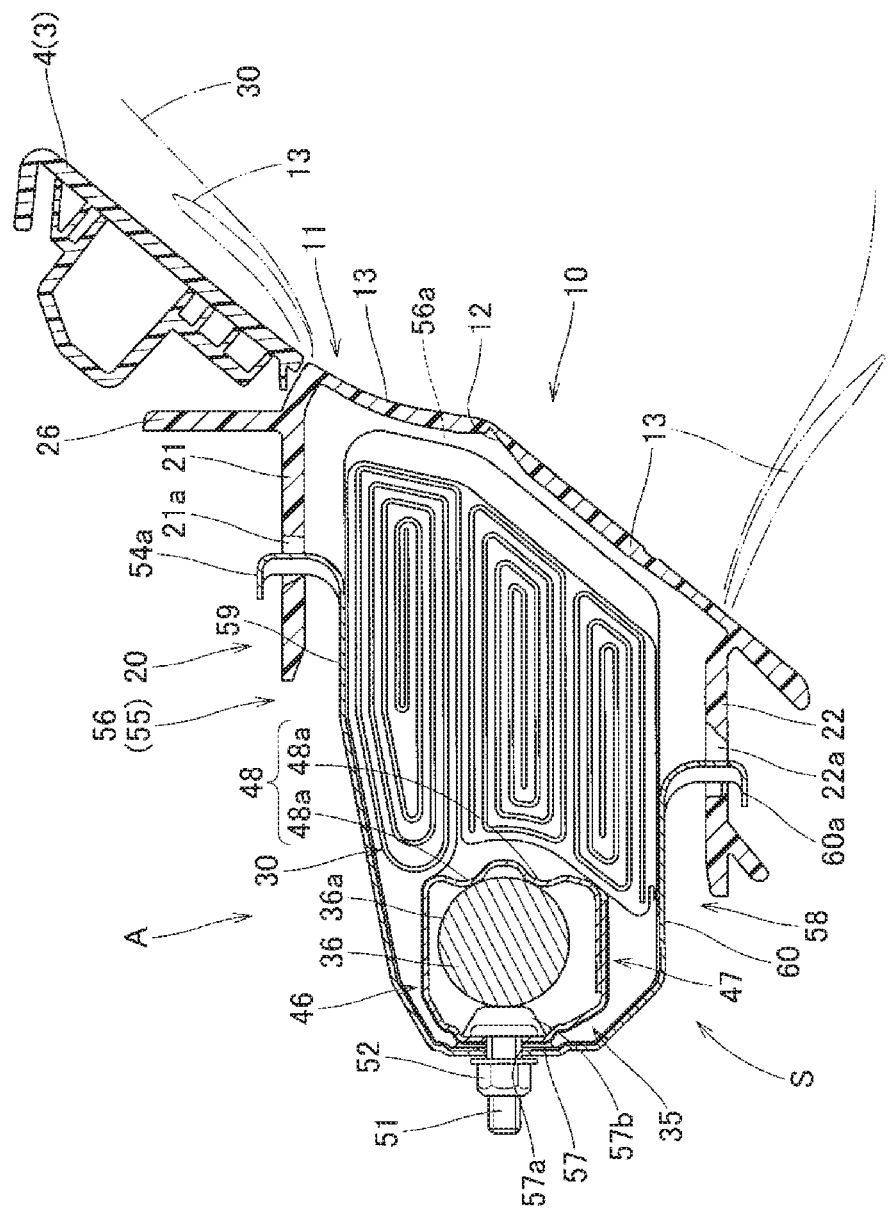
FIG. 2 is a schematic enlarged longitudinal sectional view in the vehicle front-rear direction showing the knee protection airbag device according to the embodiment.
Figure 3:
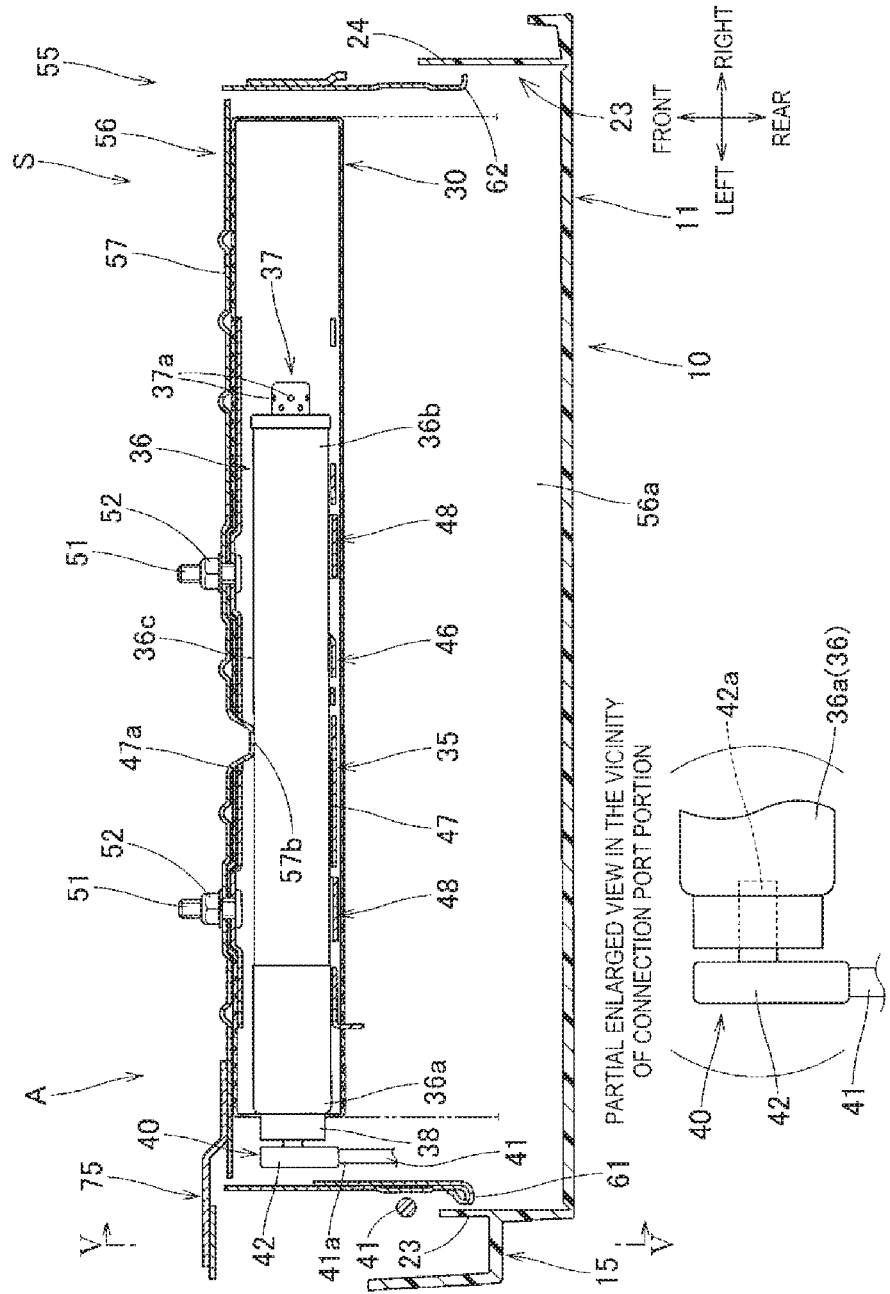
FIG. 3 is a schematic transverse sectional view in a vehicle left-right direction showing the knee protection airbag device according to the embodiment.
Figure 5:
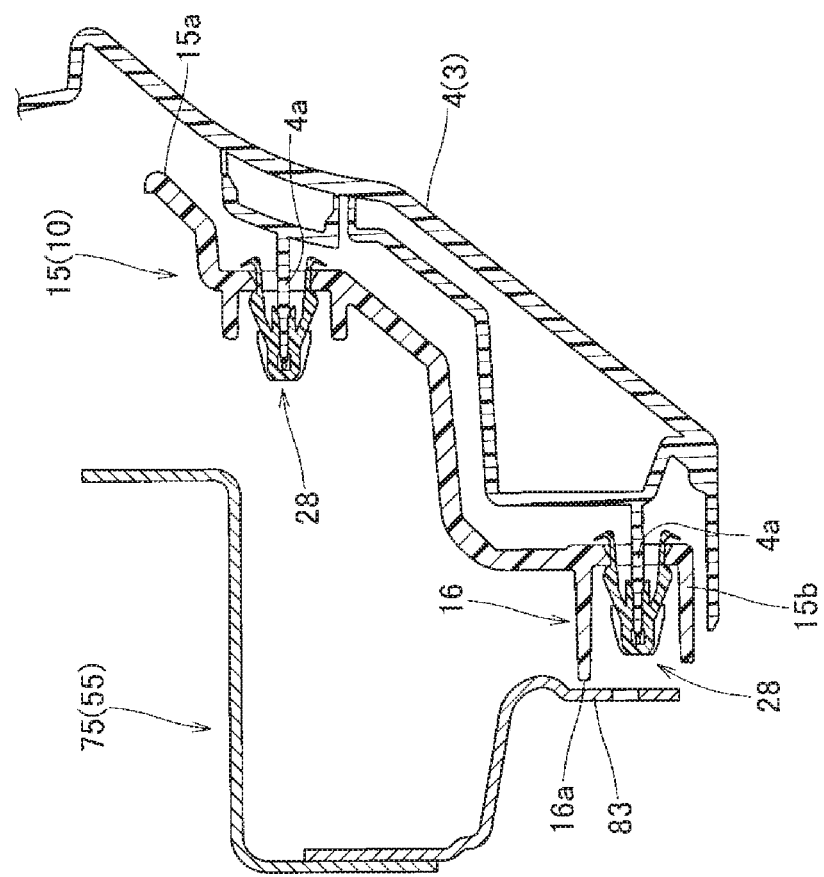
FIG. 5 is a sectional view taken along a line V-V of FIG. 3.

The door disposing portion 11 is formed in a substantially rectangular plate shape having a wide width in a left-right direction side, is arranged so as to be inclined with respect to an upper-lower direction so that a lower end side thereof is positioned forward when viewed from the left-right direction side (see FIGS. 2 and 3), and therefore includes the two door portions 13, 13 that can be opened toward both upper and lower sides when the airbag 30 is deployed and inflated. The door portions 13, 13 are configured to cover the rear of the protruding opening 56a in the case main body 56. Specifically, the door portions 13, 13 have a substantially 11 shape (not shown) when viewed from a rear side, are arranged with a breakable portion 12 that can be broken by being pressed by the inflating airbag 30 at a periphery thereof, and are configured to open toward both the upper and lower sides by breaking the breakable portion 12 (see a two-dot chain line in FIGS. 1 and 2). As shown in FIG. 3, a stepped portion 15 formed in a stepped shape with respect to the door portion 13 is disposed on a left end side of the door disposing portion 11 so as to protrude forward. As shown in FIG. 5, a rear side of an area of the stepped portion 15 is covered by the lower panel 4 of the instrument panel 3.

Figure 4:
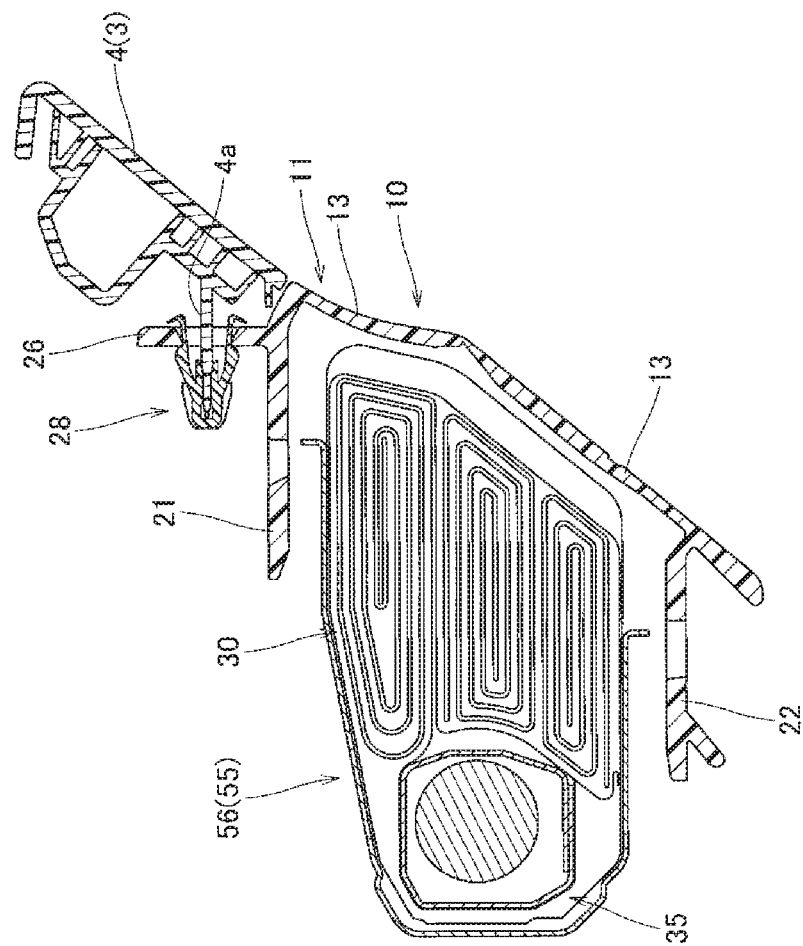
FIG. 4 is a schematic longitudinal sectional view showing an arrangement portion of a clip in the knee protection airbag device according to the embodiment.

The side wall portion 20 includes an upper wall portion 21, a lower wall portion 22, a left wall portion 23 and a right wall portion 24 which are formed so as to protrude forward from a peripheral edge of the door portion 13 so as to cover upper, lower, left and right sides of the peripheral wall portion 58 in the case main body 56, respectively. In the case of the embodiment, since the upper wall portion 21 and the lower wall portion 22 facing each other in the upper-lower direction side form an attachment piece attached to the peripheral wall portion 58 of the case main body 56, the upper wall portion 21 and the lower wall portion 22 are formed with locking holes 21a, 22a for inserting and locking locking claws 59a, 60a that are formed on an upper wall portion 59 and a lower wall portion 60 to be described later in the peripheral wall portion 58 at five positions along the left-right direction corresponding to the locking claws 59a, 60a, respectively. As shown in FIGS. 2 to 4, the left wall portion 23 and the right wall portion 24 is set to have a forward protruding amount smaller than that of the upper \van portion 21 and the lower wall portion 22, and particularly, the left wall portion 23 arranged on a connection port portion 38 side of an inflator main body 36 to be described later is configured so as not to contact a harness main body 41 inserted through a recessed groove 65 formed in a left wall portion 61 of the case 55 (see a two-dot chain line in FIG. 11). In addition, in a vicinity of a rear end of the upper wall portion 21, a protruding piece portion 26 is disposed substantially along the upper-lower direction so as to protrude upward. A rear side of the protruding piece portion 26 is covered with the lower panel 4 of the instrument panel 3 when mounted on the vehicle.

Clips 28 for inserting and locking locking bar portions 4a formed so as to protrude forward from the lower panel 4 are disposed on the protruding piece portion 26 and the stepped portion 15 described above so as to protrude forward (see FIGS. 4 and 5). The clip 28 is disposed in order to absorb an assembly error between the airbag cover 10 and the lower panel 4 and to improve designability in a vehicle interior side when attached to the vehicle. Although not shown in detail in the drawings, the clips 28 are formed at a plurality of positions of the protruding piece portion 26 along the left-right direction, and the clips 28 are formed at two positions, that is, on an upper end 15a side and a lower end 15b side of the stepped portion 15. In addition, as shown in FIG. 5, on the lower end 15b side of the stepped portion 15, a stopper 16 protruding forward is formed in a substantially rectangular tubular shape covering the entire periphery of the clip 28. In a state of being mounted on the vehicle, the stopper 16 is arranged on a rear side of a support seat 83 formed so as to extend from a bracket portion 75 to be described later in the case 55 so as to provide a gap between the stopper 16 and the support seat 83 (see FIG. 5). When the airbag cover 10 moves forward during the deployment and inflation of the airbag 30, the stopper 16 is disposed in order to make a front end 16a abut against the support seat 83 to regulate a further forward movement of the airbag cover 10.

The airbag 30 is formed of a woven fabric made of a flexible polyester yarn, polyamide yarn, or the like, is folded and stored in the case 55, and is configured to allow the inflation gas to flow thereinto, deploy upward while protruding rearward from the protruding opening 56a of the case 55 and inflate so as to be able to protect knees of a driver. Specifically, when the inflation is completed, the airbag 30 is arranged so as to cover a rear surface side of the steering column 1 and is configured to protect a knee K of a driver D, as shown by a two-dot chain line in FIG. 1. Although not shown in the drawings and described in detail, the airbag 30 is formed with an insertion hole for inserting bolts 51 of a retainer 46, a through hole for inserting a support protrusion 57h formed on a bottom wall portion 57 of the case 55, and an opening for inserting the inflator main body 36 at portions disposed in the case 55 (the case main body 56) when the inflation is completed.

As shown in FIGS. 2 and 3, the inflator 35 includes the substantially cylindrical inflator main body 36 and the retainer 46 that attaches the inflator main body 36 to a case 55 side.

As shown in FIGS. 2 and 3, the inflator main body 36 has a substantially cylindrical shape that is arranged with an axial direction substantially along the left-right direction, and includes a gas discharge port 37a for discharging the inflation gas, on one end side (in the case of the embodiment, a right end 36b side) along the axial direction and a connection port portion 38 connecting a wire harness 40 connected to a lead wire (not shown) extending from the airbag operation circuit, on the other end side along the axial direction (a left end 36a side). A large number of gas discharge ports 37a are formed on a gas discharge portion 37 having a small diameter projecting from the right end 36b side of the inflator main body 36. In a state of being connected to the wire harness 40, the inflator main body 36 is attached to the case 55 using the retainer 46, and is stored in the case 55.

Figure 9:
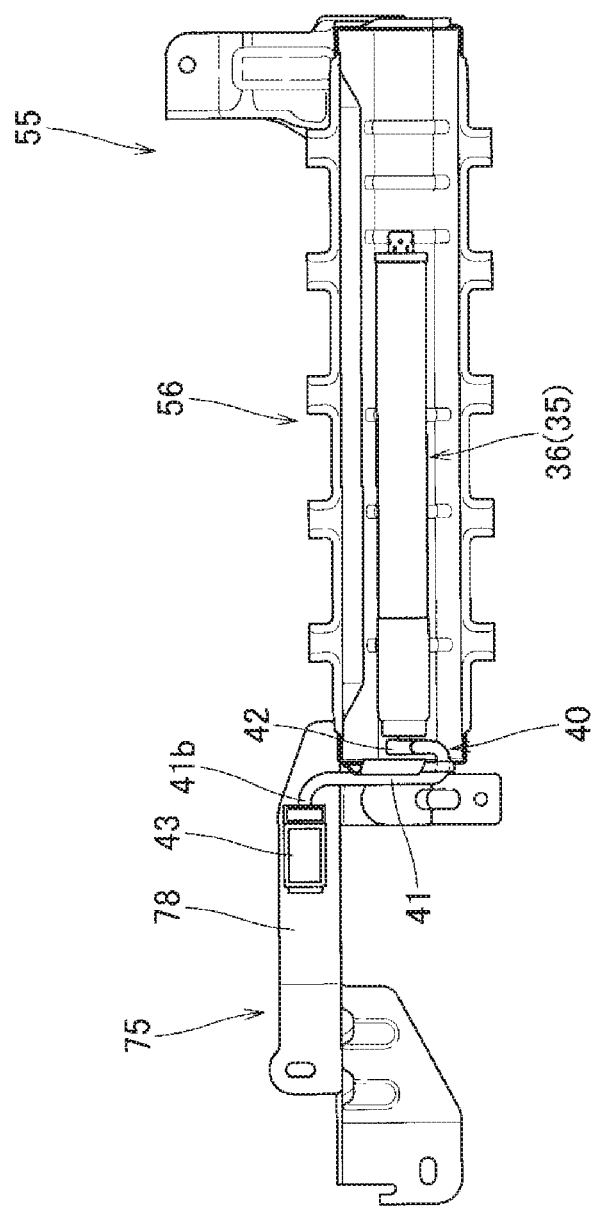
FIG. 9 is a front view showing a state in which an inflator main body to which a wire harness is connected is attached in the case of FIG. 6.
Figure 10:
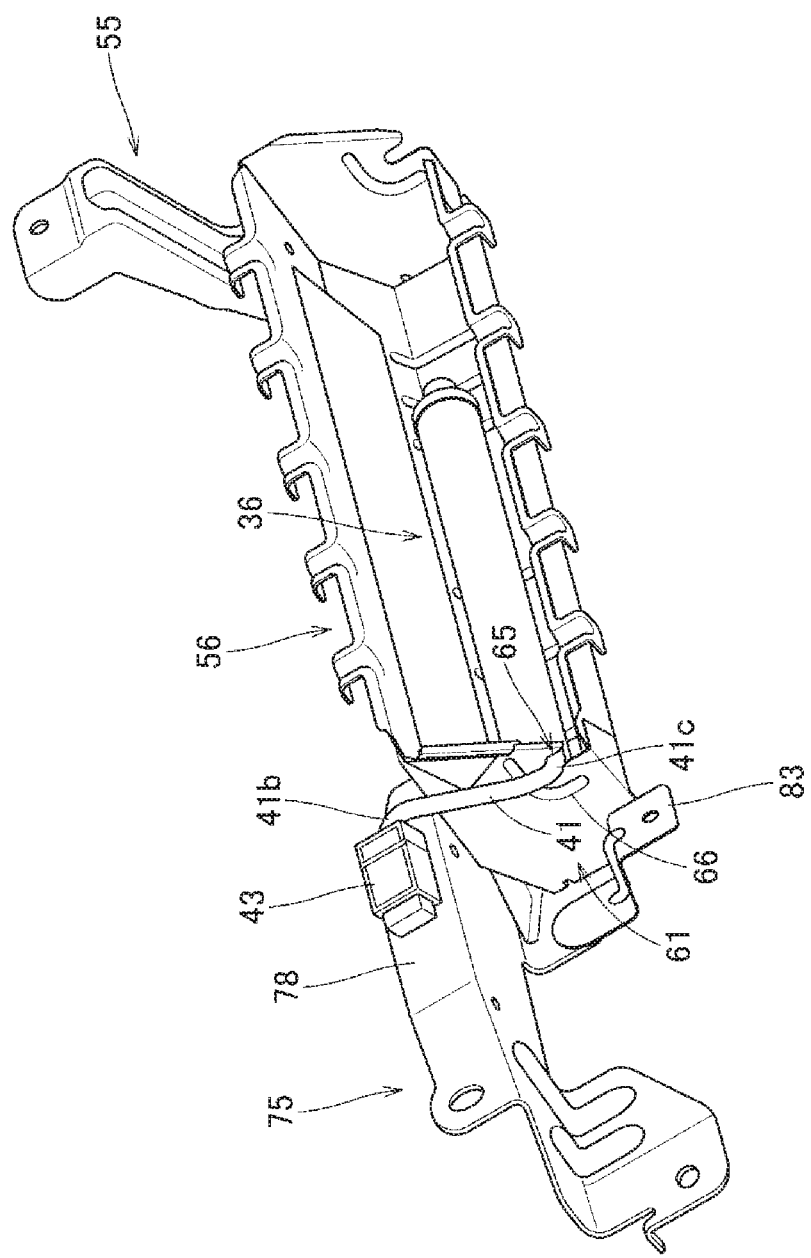
FIG. 10 is a schematic perspective view showing the state in which the inflator main body to which the wire harness is connected is attached in the case of FIG. 6.
Figure 11:
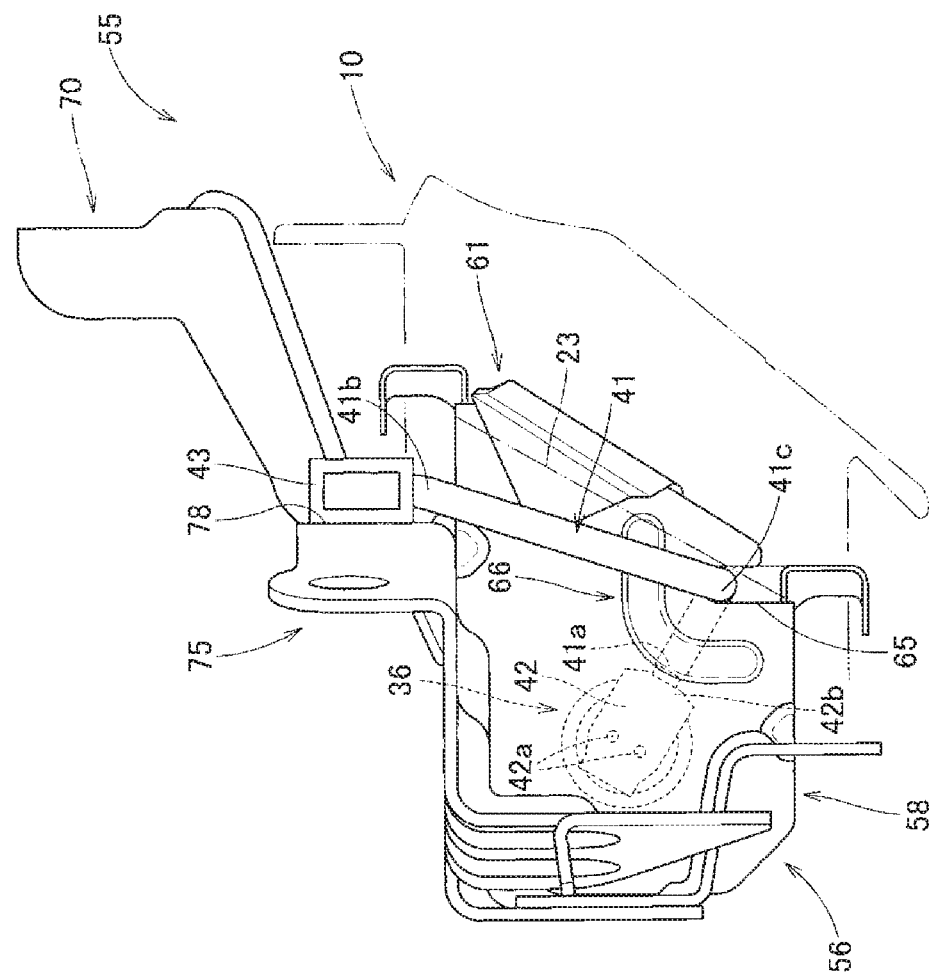
FIG. 11 is a left side view showing in a state in which the inflator main body to which the wire harness is connected is removed from the case of FIG. 6.

The wire harness 40 connected to the connection port portion 38 of the inflator main body 36 includes the harness main body 41 and a connector 42 provided on a tip end (an end portion 41a) side of the harness main body 41 and connected to the connection port portion 38, and as shown in FIG. 3, the connector 42 is formed with a plug 42a to be inserted into the connection port portion 38. As shown in FIG. 11, the plug 42a is formed of two insertion pins, and the connector 42 is connected to the inflator main body 36 so as not to rotate with respect to the inflator main body 36 by inserting the plug 42a (the insertion pins) into the connection port portion 38. The connector 42 has a substantially rectangular plate shape in an outer shape, and is configured to extend the harness main body 41 from a rear end side when mounted on the vehicle (see FIG. 11). The harness main body 41 is arranged so as to extend rearward and downward from the connector 42, and is configured to protrude to the outside of the case main body 56 while being reversed so as to insert through the recessed groove 65 formed in the case main body 56 of the case 55. The harness main body 41 has a configuration in which a connector 43 for connecting the lead wire (not shown) extending from a body side of the vehicle is disposed at the other end (an end portion 41b). As shown in FIGS. 9 to 11, the connector 43 is configured to be fixed to the bracket portion 75 by locking a clip (not shown) to a locking hole 79 formed in a vertical wall portion 78 formed on the bracket portion 75 of the case 55. Further, in a state in which the connector 43 is fixed to the vertical wall portion 78, the harness main body 41 is configured such that a portion inserted through the recessed groove 65 is a reversal portion 41c, and is arranged on a left side of the left wall portion 61 of the case main body 56 so as to be slightly inclined while substantially extending in the upper-lower direction such that the end portion 41h on which the connector 43 is disposed is positioned above and slightly behind the recessed groove 65 (see FIG. 11).

As shown in FIGS. 2 and 3, the retainer 46 includes a holding portion 47 holding the inflator main body 36, and the two bolts 51, 51 as attachment means projecting substantially perpendicular to an axial direction of the holding portion 47.

The holding portion 47 is made of sheet metal and is formed in a substantially tubular shape through which the inflator main body 36 can be inserted. In the holding portion 47, a through hole 47a through which the support protrusion 57b formed on the bottom wall portion 57 of the case 55 is inserted is formed at a position on a front side of the inflator main body 36 when mounted on the vehicle and between the bolts 51, 51. In addition, in the holding portion 47, abutment portions 48 that abut against an outer peripheral surface 36c of the inflator main body 36 are formed at positions on a rear side of the inflator main body 36 opposite to the bolts 51 when mounted on the vehicle. As shown in FIG. 3, the abutment portions 48 are formed at two positions corresponding to the respective bolts 51, and as shown in FIG. 2, each include two protrusions 48a arranged side by side in the upper-lower direction side in a cross section along the front-rear direction. Each of the protrusions 48a is formed by partially recessing the holding portion 47 toward the inflator main body 36 side, and is configured such that an outer shape thereof is substantially a semicircular arc shape, and a tip end surface can abut against the outer peripheral surface 36c of the inflator main body 36.

In the airbag device S according to the embodiment, the inflator main body 36 in a state of being connected to the wire harness 40 is inserted through the holding portion 47 of the retainer 46 arranged in the airbag 30, and when the airbag 30 is stored in the case 55, the bolts 51 of the retainer 46 protrude from the bottom wall portion 57 of the case 55, and the inflator 35 and the airbag 30 are attached to the case 55 by fastening nuts 52 to the bolts 51. Specifically, at the time of fastening the nuts 52, the inflator main body 36 is held by the retainer 46 by being sandwiched between the support protrusion 57b formed on the bottom wall portion 57 of the case 55 and the abutment portion 48 formed on the holding portion 47 of the retainer 46.

Figure 6:
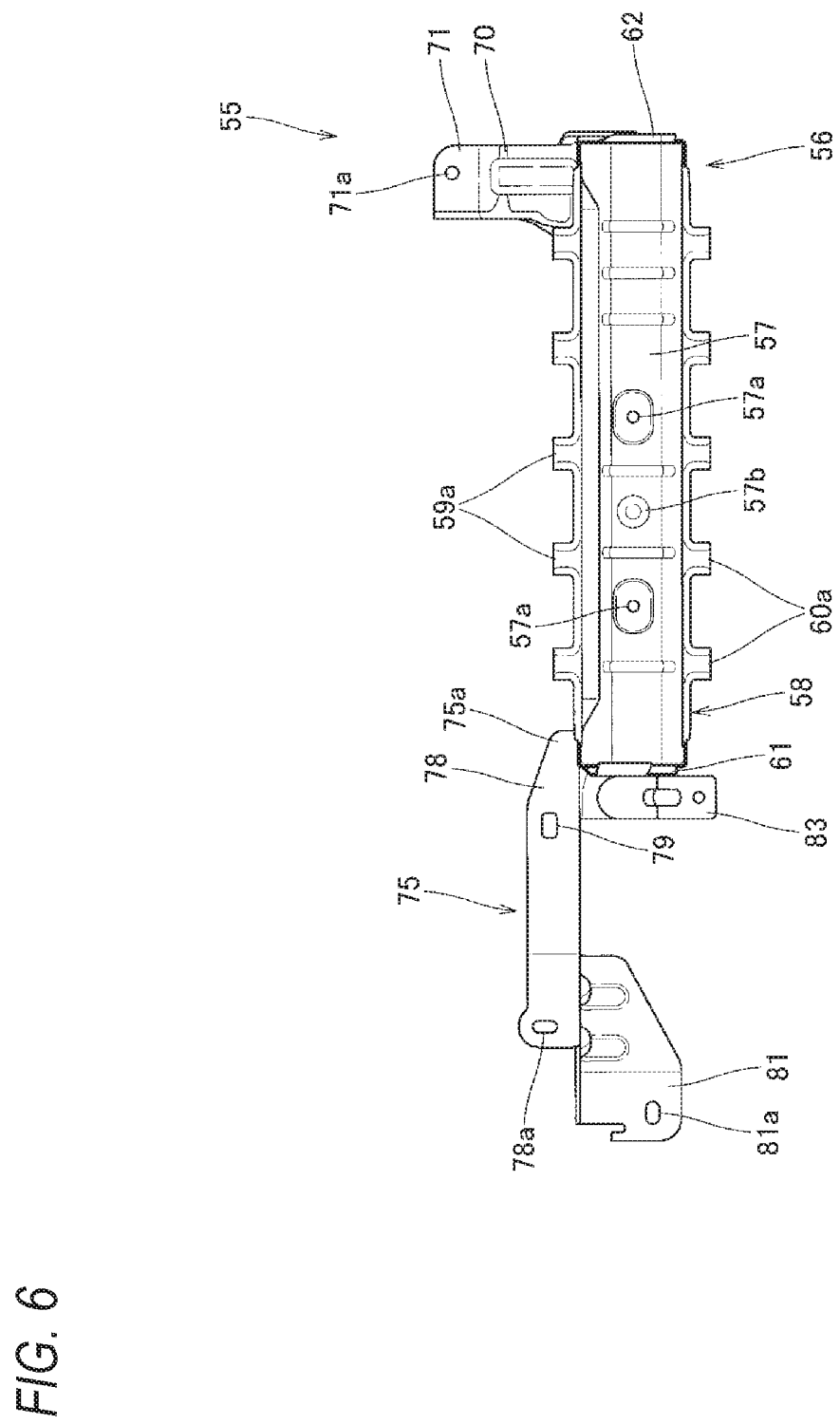
FIG. 6 is a front view of a case used in the knee protection airbag device according to the embodiment.
Figure 7:
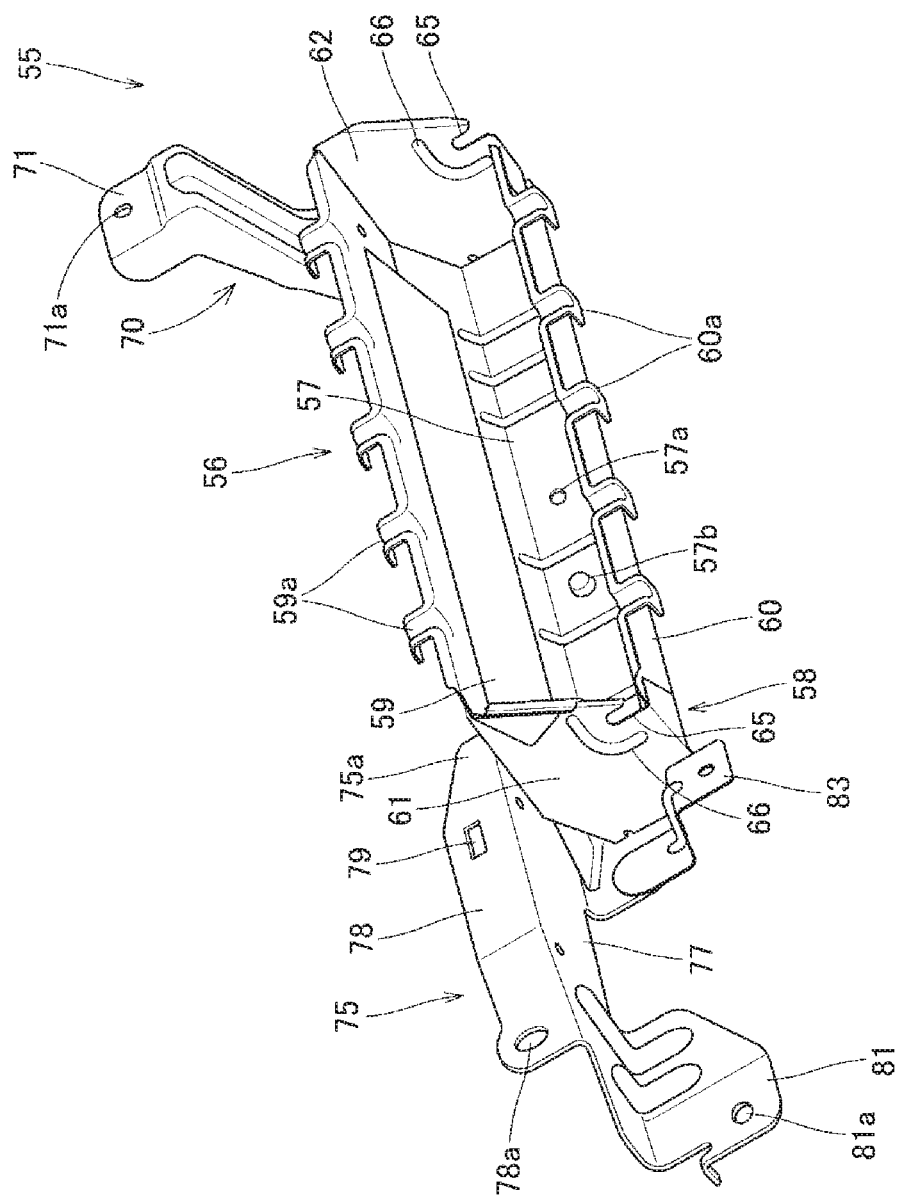
FIG. 7 is a schematic perspective view of the case of FIG. 6.
Figure 8:
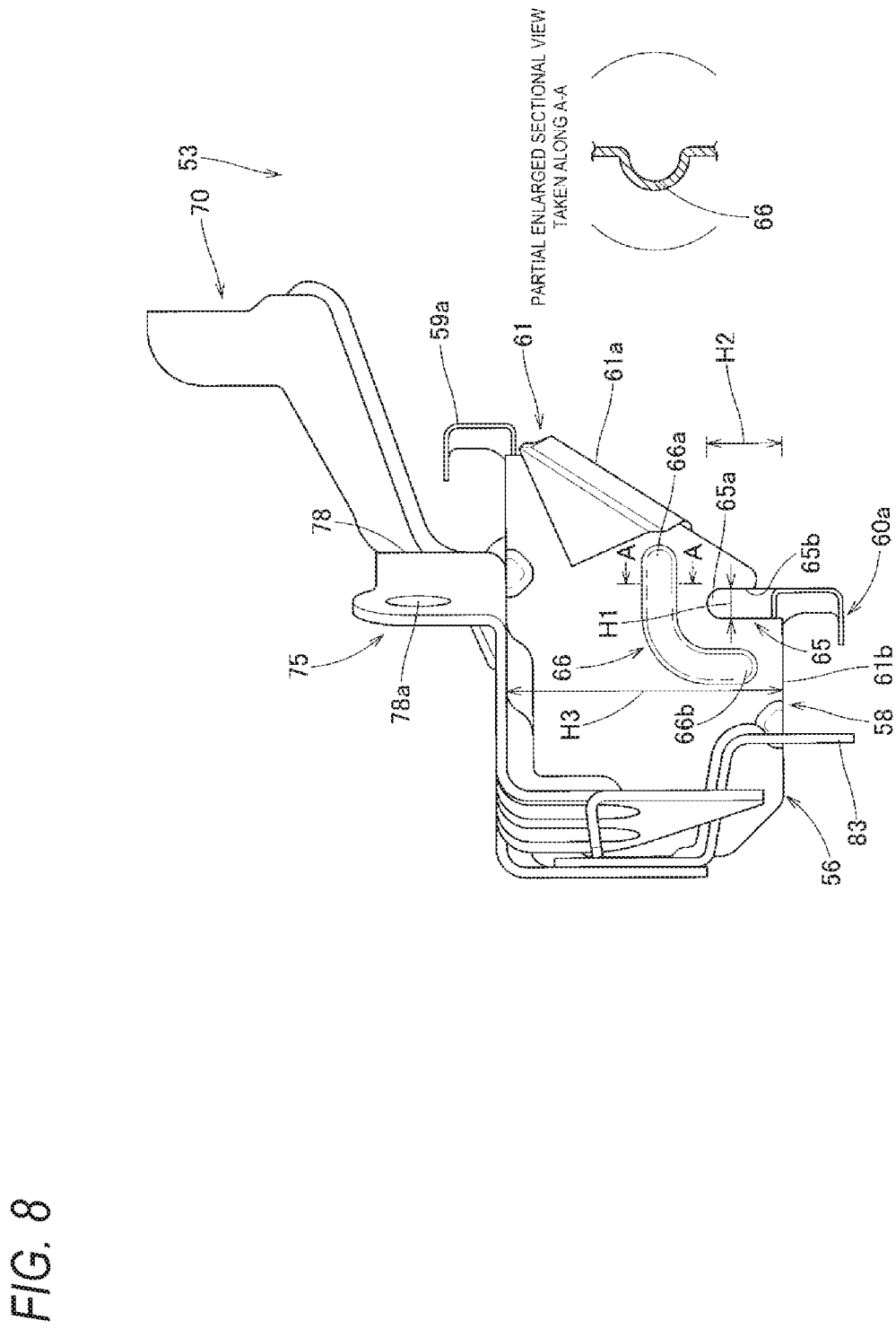
FIG. 8 is a left side view of the case of FIG. 6.

As shown in FIGS. 6 to 8, in the case of the embodiment, the case 55 that stores the airbag 30 and the inflator 35 includes the case main body 56 and bracket portions 70, 75 that attach the case main body 56 to the body side of the vehicle.

The case main body 56 includes the bottom wall portion 57 and the substantially tubular peripheral wall portion 58 extending from a peripheral edge of the bottom wall portion 57, has a box shape having the protruding opening 56a through which the airbag 30 can protrude, and in the case of the embodiment, is configured such that the protruding opening 56a is disposed on the rear end side when mounted on the vehicle as shown in FIGS. 2 and 3. That is, in the case main body 56 of the embodiment, the peripheral wall portion 58 is configured to extend rearward from the peripheral edge of the bottom wall portion 57. In addition, the case main body 56 of the embodiment stores the inflator 35 that is arranged such that the axial direction thereof is substantially along the left-right direction, and has a flat substantially box shape in which a width dimension in the left-right direction is set to be large. Insertion holes 57a, 57a through which the bolts 51 disposed on the retainer 46 are inserted and the support protrusion 57b formed so as to protrude toward the inside of the case main body 56 (the inflator main body 36 side) substantially along a protruding direction of the bolts 51 are formed on the bottom wall portion 57 having a substantially rectangular shape that is wide in the left-right direction. Each of the insertion holes 57a is formed at a position substantially at a center of the bottom wall portion 57 in the upper-lower direction. As shown in FIG. 3, the support protrusion 57b is configured in a substantially trapezoidal shape whose a cross section is narrowed toward a tip end side, and is configured to be able to support the inflator main body 36 by abutting a tip end against the outer peripheral surface 36c of the inflator main body 36 when mounted on the vehicle. As shown in FIG. 6, the support protrusion 57b is formed at a position substantially at a center between the insertion holes 57a, 57a.

The peripheral wall portion 58 has a flat substantially rectangular tubular shape that is wide in the left-right direction, and includes the upper wall portion 59 and the lower wall portion 60 facing each other in the upper-lower direction, and the left wall portion 61 and a right wall portion 62 facing each other in the left-right direction. That is, in the embodiment, the upper wall portion 59 and the lower wall portion 60 form long walls arranged along the axial direction of the inflator main body 36 so as to face each other on a side perpendicular to the axial direction of the inflator main body 36, and the left wall portion 61 and the right wall portion 62 form short walls arranged so as to face each other in the axial direction side of the inflator main body 36. Further, in the vicinity of rear ends of the upper wall portion 59 and the lower wall portion 60 (a peripheral edge of the protruding opening 56a) as the long walls, the locking claws 59a, 60a for locking the periphery of the locking holes 21a, 22a formed in the upper wall portion 21 and the lower wall portion 22 (the attachment piece) of the airbag cover 10 are formed to protrude upward and downward and bend into a substantially L-shaped cross section so that tip ends thereof are directed forward, respectively. Five locking claws 59a, 60a are formed in the upper wall portion 59 and the lower wall portion 60 along the left-right direction, respectively.

The recessed groove 65 through which the harness main body 41 of the wire harness 40 can be inserted is formed on the left wall portion 61 as the short wall arranged on the connection port portion 38 side of the inflator main body 36. The left wall portion 61 on which the recessed groove 65 is arranged is configured such that a rear edge 61a is inclined with respect to the upper-lower direction so that a lower end side is positioned on a front side in accordance with the door disposing portion 11 of the airbag cover 10. Further, the recessed groove 65 is formed by recessing the rear edge 61a of the left wall portion 61 forming the peripheral edge of the protruding opening 56a in the case main body 56, and specifically, is formed so as to cut off a rear lower end side of the left wall portion 61. More specifically, as shown in FIG. 8, the recessed groove 65 is formed so as to cut out a boundary portion between a lower edge 61b and the rear edge 61a on the rear end side of the lower edge 61b of the left wall portion 61, and is formed as a groove shape having a constant width dimension substantially along the upper-lower direction so as to be recessed upward while opening the lower end side. The recessed groove 65 has the substantially constant width dimension and has a substantially semicircular arc shape at a bottom portion 65a of the recess. That is, the recessed groove 65 is formed such that an opening end 65b is positioned below the bottom portion 65a of the recess. A width dimension H1 of the recessed groove 65 is set to a dimension that allows the harness main body 41 to be inserted smoothly, and a depth H2 is set to about twice the width dimension H1 (see FIG. 8). Since the recessed groove 65 is formed so as to cut out the boundary portion between the lower edge 61b and the rear edge 61a of the left wall portion 61, a substantial opening width dimension of the opening end 65b into which the harness main body 41 is inserted is larger than the width dimension, and the harness main body 41 can be smoothly inserted. In addition, since the depth H2 of the recessed groove 65 is set to about twice the width dimension H1 (substantially equal to an outer diameter of the harness main body 41), it is possible to prevent the harness main body 41 inserted through the recessed groove 65 from coming off. Further, the recessed groove 65 is formed such that a depth H2 thereof is set to about ⅓ of a width dimension H3 of the left wall portion 61 on the upper-lower direction side, and is formed at a position below the connector 42 of the inflator 35 attached to the case 55 such that an axial center substantially coincides with a center of the left wall portion 61 in the upper-lower direction (see FIG. 11).

As shown in FIG. 8, on the left wall portion 61, a bead 66 for reinforcement at a peripheral edge portion of the recessed groove 65 is formed so as to surround a periphery of the recessed groove 65. Specifically, the bead 66 is formed in a substantially inverted L-shape when the case 55 is viewed from the side so as to continuously surround the periphery of the recessed groove 65, by bending the left wall portion 61 itself so as to protrude outward in the left-right direction. More specifically, the bead 66 is configured such that a rear end 66a is positioned in a vicinity of the rear edge 61a of the left wall portion 61 behind the recessed groove 65, and a lower end 66b is positioned in a vicinity of the lower edge 61b of the left wall portion 61. In the embodiment, the recessed groove 65 and the bead 66 are also formed on the right wall portion 62 (see FIG. 7).

The bracket portions 70, 75 are disposed on both left and right end sides of the case main body 56, respectively. As shown in FIGS. 7 and 8, the bracket portion 70 disposed on the right side is disposed so as to extend obliquely rearward and upward from a right end side of the upper wall portion 59 of the case main body 56, and an attachment piece 71 attached to a member on the body side is formed so as to extend upward from a tip end side of the bracket portion 70. An attachment hole 71a is formed in the attachment piece 71.

As shown in FIGS. 6 and 7, the bracket portion 75 disposed on the left side is disposed so as to extend leftward from a left end side of the case main body 56, and specifically, is configured to cover from the upper wall portion 59 to the bottom wall portion 57 at the left end of the case main body 56 in a base portion 75a side, and extends leftward from the left end side of the upper wall portion 59. The bracket portion 75 includes a horizontal wall portion 77 substantially along the upper wall portion 59 and the vertical wall portion 78 substantially along the upper-lower direction so as to extend upward from a rear end of the horizontal wall portion 77. The vertical wall portion 78 is arranged at a position slightly rearward of the recessed groove 65 formed in the left wall portion 61 when the case 55 is viewed from the left-right direction side (see FIG. 8). In the vertical wall portion 78, on the position on the left side of the left wall portion 61, as described above, the locking hole 79 for fixing the connector 43 arranged on the end portion 41h side of the harness main body 41 is opened and formed in a substantially rectangular shape that is wide in the left-right direction (see FIGS. 6 and 7). An attachment hole 78a for attaching to the member on the body side is formed at a tip end (a left end) side of the vertical wall portion 78. The horizontal wall portion 77 is configured to extend leftward from the vertical wall portion 78, and includes an attachment piece 81 extending downward from a front edge and attached to the member on the body side on a tip end side (see FIG. 7). An attachment hole 81a is formed in the attachment piece 81. In addition, the support seat 83 that covers the front of the stopper 16 of the airbag cover 10 described above is formed on the base portion 75a side of the bracket portion 75 so as to extend from the base portion 75a side. Specifically, the support seat 83 is formed adjacent to the left wall portion 61 of the case main body 56 and at a position slightly forward of a center in the front-rear direction of the left wall portion 61 so as to extend in the upper-lower direction (see FIG. 8), and is arranged so as to provide the gap between the support seat 83 and the stopper 16 when mounted on the vehicle as shown in FIG. 5. More specifically, the support seat 83 is disposed in an area on a right side (the case main body 56 side) of a center of the locking hole 79 (see FIG. 6). The gap between the support seat 83 and the stopper 16 is set to a size that allows the stopper 16 to abut against the support seat 83 to regulate the further forward movement of the airbag cover 10 when the airbag cover 10 moves forward during the deployment and inflation of the airbag 30.

Next, mounting of the knee protection airbag device S according to the embodiment on a vehicle will be described. First, the retainer 46 is stored inside the airbag 30 so that the bolt 51 protrudes from the insertion hole (not shown). After that, the airbag 30 is folded into a size capable of being stored in the case 55 (the case main body 56) from a flatly deployed state, and the folded airbag 30 is wrapped around by a breakable wrapping material (not shown) for preventing folding collapse. At this time, an insertion slit (not shown) for inserting the inflator main body 36 is exposed from the wrapping material.

Next, the inflator main body 36 in a state of being connected to the wire harness 40 is inserted into the airbag 30 (inside the holding portion 47 of the retainer 46) from the gas discharge port 37a side. Thereafter, the folded airbag 30 and the inflator main body 36 are stored in the case 55 so as to protrude the bolt 51 from the bottom wall portion 57. Next, the inflator main body 36 is rotated together with the wire harness 40 so that the harness main body 41 is inserted into the recessed groove 65, then the nut 52 is fastened to the bolt 51 protruding from the bottom wall portion 57 in a state in which the insertion of the harness main body 41 into the recessed groove 65 is maintained, and the airbag 30 and the inflator 35 in which the inflator main body 36 and the retainer 46 are integrated are attached to the case 55. At this time, the harness main body 41 is attached to the case 55 by fixing the connector 43 arranged on the end portion 41b side to the bracket portion 75 of the case 55 in a state of being inserted into the recessed groove 65. Thereafter, if the airbag cover 10 is assembled to the case 55, an airbag assembly A can be assembled. Then, the airbag assembly A is attached to the member on the body side of the vehicle using the bracket portions 70, 75 of the case 55, and at the same time, the lead wire (not shown) extending from the airbag operation circuit is connected to the connector 43 attached to the bracket portion 75 of the case 55. Thereafter, if the lower panel 4 (the instrument panel 3) and the under cover 5 are attached by inserting the locking bar portion 4a into the clip 28 provided in the airbag cover 10, the knee protection airbag device S can be mounted on the vehicle.

If an operation signal is input to the inflator main body 36 after the knee protection airbag device S is mounted on the vehicle, the inflation gas is discharged from the gas discharge port 37a of the inflator main body 36 and flows into the airbag 30. Further, the airbag 30 is inflated to break the wrapping material (not shown), then protrudes from the protruding opening 56a of the case 55 while pushing out and opening the door portions 13, 13 of the airbag cover 10, and completes the inflation so as to cover the rear surface side of the steering column 1 while deploying rearward and upward as shown by the two-dot chain line in FIG. 1.

In the knee protection airbag device S according to the embodiment, the inflator 35 is stored in the case 55 in the state in which the wire harness 40 is connected to the inflator main body 36, but the recessed groove 65 through which the harness main body 41 of the wire harness 40 can be inserted is formed at a portion of a peripheral edge of the protruding opening 56a of the case 55 so as to recess an end edge (in the case of the embodiment, the rear edge 61a of the left wall portion 61) of the peripheral wall portion 58, so that an arrangement position of the harness main body 41 with respect to the case 55 can be regulated by inserting the harness main body 41 through the recessed groove 65. In addition, since the harness main body 41 is inserted through the recessed groove 65 formed so as to recess the portion of the peripheral edge of the protruding opening 56a and extends out of the case 55, interference between the harness main body 41 and the airbag cover 10 arranged so as to cover the protruding opening 56a can also be suppressed. Since the harness main body 41 is inserted through the recessed groove of the case 55, the harness main body 41 can be suppressed from moving with respect to the case 55 during transportation, attachment work to the body side, or the like, and a handling workability of the wire harness 40 is improved during attachment work to the vehicle or the like. Further, since the bead 66 for reinforcement at the peripheral edge portion of the recessed groove 65 is disposed around the recessed groove 65 so as to surround the periphery of the recessed groove 65, even in a configuration having the recessed groove 65 formed by cutting off the peripheral wall portion 58 itself, which causes a decrease in strength, when the airbag 30 is deployed and inflated, deformation of the case 55 can be suppressed, and the airbag 30 can be smoothly protruded from the protruding opening 56a and inflated.

Therefore, in the knee protection airbag device S according to the embodiment, an arrangement position of the wire harness 40 with respect to the case 55 can be set, and handleability of the wire harness 40 is good, even in a configuration in which the inflator 35 is stored in the case 55 in a state of being connected to the wire harness 40.

In the knee protection airbag device S according to the embodiment, the peripheral wall portion 58 of the case 55 has the substantially rectangular tubular shape including the upper wall portion 59 and the lower wall portion 60 as the two long walls arranged along the axial direction of the inflator main body 36 so as to face each other on the side (in the case of the embodiment, in the upper-lower direction side) perpendicular to the axial direction of the inflator main body 36, and left wall portion 61 and the right wall portion 62 as the two short walls arranged so as to face each other on the axial direction side (in the case of the embodiment, the left-right direction side) of the inflator main body 36, and the airbag cover 10 is configured such that the upper wall portion 21 and the lower wall portion 22 as the attachment pieces are attached to the upper wall portion 59 and the lower wall portion 60 of the case 55, and the recessed groove 65 is formed in the left wall portion 61. That is, in the knee protection airbag device S according to the embodiment, the recessed groove 65 is disposed at a position separated from the attachment piece (the upper wall portion 21 and the lower wall portion 22) for attaching the airbag cover 10 disposed to cover the protruding opening 56a of the case 55 to the case 55, in other words, in the airbag cover 10, it is not necessary to provide an attachment piece that connects the left wall portion 61 and the right wall portion 62 as the short walls provided with the recessed grooves 65, and therefore a portion of the airbag cover 10 (the left wall portion 23 and the right wall portion 24) covering the left wall portion 61 and the right wall portion 62 as the short walls can be configured not to cover the recessed groove (see the two-dot chain line in FIG. 11), so that the interference between the harness main body 41 inserted through the recessed groove 65 and the airbag cover 10 can be accurately suppressed. Incidentally, if such a point is not taken into consideration, the recessed groove may be disposed in an area in the long wall (in the case of the embodiment, the upper wall portion and the lower wall portion).

In the knee protection airbag device S according to the embodiment, the recessed groove 65 is arranged at a position below the connector 42 on the lower edge 61b side of the left wall portion 61, and is formed such that the opening end 65b is positioned below the bottom portion 65a of the recess. Therefore, when mounted on the vehicle, since the harness main body 41 is arranged so as to extend downward from the connector 42 by inserting through the recessed groove 65 arranged below the connector 42, even if rainwater or the like adheres to the harness main body extending out of the case 55 and travels through the harness main body 41, it is possible to accurately prevent the rainwater or the like from entering the connector 42 side, which is preferable. Particularly, in the embodiment, since the connector 43 arranged on the end portion 41b side of the harness main body 41 is attached to the bracket portion 75 arranged above the recessed groove 65, and the harness main body 41 is arrange such that the area thereof inserted through the recessed groove 65 is a lower end, and this area is the reversal portion 41c so as to be reversed upward, even if the rainwater or the like adheres to the harness main body 41 and travels through the harness main body 41, the rainwater or the like can be dropped from the reversal portion 41c inserted through the recessed groove 65, and can be accurately prevented from entering the case 55 along the harness main body 41. Incidentally, if such a point is not taken into consideration, the recessed groove may be arranged at a position above the connector.

In the knee protection airbag device S according to the embodiment, since the stopper 16 that abuts against the support seat 83 formed on the case 55 side and can regulate the forward movement of the airbag cover 10 when the airbag 30 is deployed and inflated is formed on the airbag cover 10, the largely forward movement of the airbag cover 10 with respect to the case 55 can be accurately regulated when the airbag 30 is deployed and inflated.

In the embodiment, the bead 66 formed on the left wall portion 61 of the case 55 is formed so as to partially protrude outward from the left wall portion itself, but a shape of the bead is not limited to the embodiment, and for example, the bead may be formed by fixing a member separate from the case main body.

In the embodiment, a knee protection airbag device using a case having a configuration in which a protruding opening is disposed on the rear end side when mounted on the vehicle is described as an example, but the knee protection airbag device to which the present invention is applicable is not limited to the embodiment. The present invention is also applicable to a knee protection airbag device using a case having a configuration in which the protruding opening is disposed on the lower end side when mounted on the vehicle.

What is claimed is:
1. A knee protection airbag device comprising:
an airbag that is folded and stored;
an inflator configured to supply inflation gas to the airbag;
a case that stores the airbag and the inflator; and
an airbag cover covering the folded airbag, wherein:
the case includes a bottom wall portion and a peripheral wall portion having a substantially tubular shape extending from a peripheral edge of the bottom wall portion, and is formed in a substantially box shape having a protruding opening through which the airbag is capable of protruding;

the airbag cover includes a door portion that covers the protruding opening and can be opened when the airbag is deployed and inflated, and is attached to the peripheral wall portion of the case around the door portion;

the inflator includes an inflator main body having a substantially cylindrical shape, and a retainer configured to attach the inflator main body to the case side;

the inflator main body is configured such that a gas discharge port configured to discharge the inflation gas is disposed on one end side along an axial direction, and a connection port portion for connecting a wire harness extending from an airbag operation circuit is disposed on another end side along the axial direction, and is attached to the case by fixing an attachment means arranged so as to protrude from the retainer to a side perpendicular to the axial direction to the bottom wall portion in a state in which an outer peripheral surface thereof is held by the retainer;

the wire harness includes a harness main body and a connector provided on a tip end side of the harness main body;

the inflator main body is stored in the case in a state in which the connector is connected to the connection port portion and the wire harness is connected to the inflator main body;

a recessed groove through which the harness main body can be inserted is formed at a portion of a peripheral edge of the protruding opening in the case so as to recess an end edge of the peripheral wall portion; and a bead for reinforcement at a peripheral edge portion of the recessed groove is formed on the peripheral wall portion so as to surround a periphery of the recessed groove, wherein:

the peripheral wall portion has a substantially rectangular tubular shape including two long walls arranged along the axial direction of the inflator main body so as to face each other on the side perpendicular to the axial direction of the inflator main body, and two short walls arranged so as to face each other on an axial direction side of the inflator main body;

the airbag cover is configured such that an attachment piece extending from a periphery of the door portion is attached to the long wall; and the recessed groove is formed in at least one of the short walls.

2. The knee protection airbag device according to claim 1, wherein:

the two long walls are disposed so as to face each other on an upper-lower direction side; and the recessed groove is arranged at a position below the connector on a lower edge side of the short wall, and is formed such that an opening end is positioned below a bottom portion of a recess.

* * * * *